(12) United States Patent
Sonoda et al.

(10) Patent No.: US 7,530,594 B2
(45) Date of Patent: *May 12, 2009

(54) SNOWMOBILE WITH AIRBAG SYSTEM

(75) Inventors: Yuji Sonoda, Iwata (JP); Takashi Shimizu, Hamamatsu (JP); Koji Kurata, Hamamatsu (JP)

(73) Assignee: Suzuki Kabushiki Kaisha, Hamamatsu-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/929,146

(22) Filed: Oct. 30, 2007

(65) Prior Publication Data

US 2008/0054607 A1 Mar. 6, 2008

Related U.S. Application Data

(62) Division of application No. 11/111,885, filed on Apr. 22, 2005, now Pat. No. 7,344,151.

(30) Foreign Application Priority Data

Apr. 26, 2004 (JP) ............................. 2004-130385

(51) Int. Cl.
 *B60R 21/16* (2006.01)
(52) U.S. Cl. .................................. 280/730.1
(58) Field of Classification Search ............. 280/730.1, 280/728.2, 743.1, 748, 751, 753
 See application file for complete search history.

(56) References Cited

U.S. PATENT DOCUMENTS

| 5,072,966 | A | 12/1991 | Nishitake et al. | |
| 5,472,230 | A | 12/1995 | Every et al. | |
| 7,044,499 | B2 | 5/2006 | Miyata et al. | |
| 7,344,151 | B2 * | 3/2008 | Sonoda et al. | 280/730.1 |

| 2003/0015861 | A1 | 1/2003 | Abe |
| 2003/0116945 | A1 | 6/2003 | Abe |
| 2003/0218317 | A1 | 11/2003 | Yamazaki et al. |
| 2004/0182629 | A1 | 9/2004 | Takahashi et al. |
| 2004/0256848 | A1 | 12/2004 | Miyata et al. |

(Continued)

FOREIGN PATENT DOCUMENTS

JP 7-108985 4/1995

(Continued)

OTHER PUBLICATIONS

U.S. Appl. No. 11/929,236, filed Oct. 30, 2007, Sonoda, et al.

(Continued)

*Primary Examiner*—Faye M. Fleming
(74) *Attorney, Agent, or Firm*—Oblon, Spivak, McClelland, Maier & Neustadt, P.C.

(57) ABSTRACT

A snowmobile is provided with airbag systems including airbag bodies expanding from a portion near a steering handle bar respectively, one of the airbag bodies expanding rearward of a handle bar and outward of both the ends of the handle bar, and the other airbag body expanding toward a front side of rider's knees. Another airbag system includes an airbag body expanding from an upper surface of an engine hood on the front portion of a vehicle body frame and blowing up toward a windshield of the engine hood. The respective airbag systems are detachable from the vehicle body, and hence, can be stored indoors.

11 Claims, 6 Drawing Sheets

U.S. PATENT DOCUMENTS

2005/0127646 A1  6/2005  Kobayashi

FOREIGN PATENT DOCUMENTS

| JP | 9-66789 | 3/1997 |
| JP | 2001-219884 | 8/2001 |
| JP | 2001-233267 | 8/2001 |
| JP | 2002-137777 | 5/2002 |
| JP | 2003-11871 | 1/2003 |
| JP | 2003-285787 | 10/2003 |

OTHER PUBLICATIONS

U.S. Appl. No. 11/929,146, filed Oct. 30, 2007, Sonoda, et al.

* cited by examiner

SNOWMOBILE WITH AIRBAG SYSTEM

CROSS-REFERENCE TO RELATED APPLICATIONS

This application is a divisional of U.S. application Ser. No. 11/111,885, filed Apr. 22, 2005, and is based upon and claims the benefit of priority from prior Japanese Patent Application No. 2004-130385, filed Apr. 26, 2004, the entire contents of each of which are incorporated herein by reference.

BACKGROUND OF THE INVENTION

1. Field of the Invention

The present invention relates to a snowmobile with an airbag system.

2. Related Art

Since the snowmobile is used in a cold snow zone or area, it is required for a rider to be heavily dressed or protects himself/herself with winter cloth and covers his/her head with a helmet or a cap. Thus, the rider of the snowmobile is protected from impact of collision to some extent in comparison with a driver on a four-wheel vehicle.

However, in accordance with recent improvement of performance of the snowmobile, it is desired to provide an airbag system as in the four-wheel vehicles in order to secure safety of the rider in case of collision of the snowmobile.

The following points are considered when providing an airbag system on a snowmobile.

First, the snowmobile travels not only on well maintained public roads, but also on sites which are not used as a road in a normal condition such as forest or rough terrain, and hence, the rider is required to make self-supporting efforts (such as weight shift) more than that in the case of the four-wheel vehicle. Accordingly, the airbag is required so that the vehicle can maintain its original shape as much as possible after the airbag has been expanded and blown up, and restoration to travel by its own ability can be achieved after the expanded airbag has been quickly handled, in comparison with the case of the four-wheel vehicle.

Next, the snowmobile is provided with no seatbelt because the weight shift is required for the rider for maneuvering the snowmobile, and it is itself difficult to fasten the seat belt to the snowmobile. It is therefore difficult and unreasonable to mount an airbag system on the premise of simultaneous usage of the seatbelt as in the four-wheel vehicle.

Third, the snowmobile travels on the snow and the airbag system is activated by the use of gunpowder, high-pressure gas and electricity. It is therefore necessary to consider that the snow, as a matter of course, snow-melted water or refreezing of the water does not give an adverse effect or damage on the airbag system.

Fourth, the snowmobile is generally left untouched for a long time in outdoors during seasons other than winter snow season, so that there arises a problem in functional durability or the maintenance of the airbag system unlike the case of the four-wheel vehicle in which the airbag is installed in the vehicle without being left untouched for a long time.

SUMMARY OF THE INVENTION

The present invention was therefore conceived in consideration of the defects or drawbacks encountered in the prior art technology mentioned above and an object of the present invention is to provide a snowmobile with an airbag system capable of providing a rider with a high degree of freedom with respect to a vehicle body, preferably ensuring safety of the rider upon collision, being superior in functional durability, maintenance performance, serviceability, layout flexibility, and operability, and easily rescuing a rider upon collision on an accident.

The above and other objects can be achieved according to the present invention by providing, in one aspect, a snowmobile with an airbag system comprising:

a vehicle body extending in a longitudinal direction of a snowmobile;

a handle bar provided at an intermediate upper portion of the vehicle body for steering a steering skid;

an engine hood for covering a front portion of the vehicle body on a front side of the handle bar;

an engine mounted inside the engine hood;

a driver's seat provided behind the handle bar; and an airbag system provided for the vehicle body, the airbag system comprising: an airbag body formed into a bag-shape; a storage housing for storing the airbag body; an impact detection device for detecting a collision of the vehicle body; an airbag expanding device for expanding and blowing up the airbag body upon the collision of the vehicle body; and a controller for controlling the impact detection device and expansion of the airbag body, the airbag system including a first airbag body to be expanded from a portion near the handle bar and blown up rearward of the handle bar and outward of both ends of the handle bar, and a second airbag body to be expanded from a portion near the handle bar and blown up to a front side of rider's knees.

In this first aspect, the following preferred embodiments or examples may be provided.

At least the airbag body, the storage housing and the airbag expanding device of the airbag system have a structure detachable from the vehicle body integrally with the handle bar and at least one of components associated with the handle bar.

The impact detection device is provided to be detachable from the vehicle body. The airbag body may be colored other than white or in, for example, fluorescent color.

A steering shaft for supporting the handle bar is provided with a dividable portion which divides the steering shaft in an axial direction thereof and connect the steering shaft to the handle bar to be integrally rotatable.

In a second aspect of the present invention, there is also provided a snowmobile with an airbag system comprising:

a vehicle body extending in a longitudinal direction of a snowmobile;

a handle bar provided at an intermediate upper portion of the vehicle body for steering a steering skid;

an engine hood for covering the front portion of the vehicle body at a front side of the handle bar;

a windshield provided at a rear portion of the engine hood;

an engine mounted inside the engine hood;

a vehicle body frame provided so as to extend in the longitudinal direction of the vehicle body;

an airbag system provided for the vehicle body, the airbag system comprising: an airbag body formed into a bag-shape; a storage housing for storing the airbag body; an impact detection device for detecting a collision of the vehicle body; an airbag expanding device for expanding the airbag body upon the collision of the vehicle body; and a controller for controlling the impact detection device and expansion of the airbag body; and an airbag holding device provided for the vehicle body frame for expanding the airbag body from an upper surface of the engine hood toward the windshield, the windshield having an inclined surface acting as a guide slope at the time of expansion and blowing-up of the airbag body.

In this second aspect of the present invention, the following preferred embodiments or examples may be provided.

At least the airbag body, the storage housing and the airbag expanding device of the airbag system have a structure detachable from the vehicle body integrally with the handle bar and at least one of components associated with the handle bar.

The impact detection device is provided to be detachable from the vehicle body or integrated with the storage housing.

A width of the airbag body on the side of the engine hood is set to be equal to or larger than a width of the vehicle when the airbag body is expanded, and a height of a front end portion of the airbag body when grounded in front of the vehicle body is set to be higher than a base portion of the airbag body.

The airbag body may be colored other than white or in, for example, fluorescent color.

The engine is a four-stroke-cycle engine.

A front end portion of the vehicle body frame is arranged between the storage housing for storing the airbag body on the side of the engine hood and the impact detection device when viewing the vehicle body in a side view.

In a third aspect of the present invention, there is also provided a snowmobile with an airbag system comprising:

a vehicle body extending in a longitudinal direction of a snowmobile;

a handle bar provided at an intermediate upper portion of the vehicle body for steering a steering skid;

an engine hood for covering the front portion of the vehicle body at a front portion of the handle bar;

a windshield provided at a rear portion of the engine hood;

an engine mounted inside the engine hood;

a driver's seat provided behind the handle bar;

a vehicle body frame provided so as to extend in the longitudinal direction of the vehicle body; and an airbag system provided for the vehicle body, the airbag system comprising: an airbag body formed into a bag-shape; a storage housing for storing the airbag body; an impact detection device for detecting a collision of the vehicle body; an airbag expanding device for expanding the airbag body upon the collision of the vehicle body; and a controller for controlling the impact detection device and expansion of the airbag body, the airbag system including a first airbag body to be expanded from a portion near the handle bar and blown up rearward of the handle bar and outward of both ends of the handle bar, a second airbag body to be expanded from a portion near the handle bar and blown up to a front side of rider's knees, and a third airbag body to be expanded from an upper surface of the engine hood toward the windshield having an inclined surface as a guide slop for the blowing-up of the third airbag.

In this third aspect, the following preferred embodiments or examples may be provided.

It may be selected, depending on a degree of an impact of the collision, whether only the airbag body on the side of the handle bar is to be expanded, both the airbag body on the side of the handle bar and the airbag body on the side of the engine hood are to be expanded, and the airbag body on the side of the engine hood is delayed in an expansion timing with respect to a timing of the expansion of the airbag body on the side of the handle bar.

The timing of the expansion of the airbag body on the side of the engine hood is delayed with respect to the timing of expansion of the airbag body on the side of the handle bar, and the surface area of expansion of the airbag body on the side of the engine hood is larger than the surface area of expansion of the airbag body on the side of the handle bar.

The airbag body on the side of the engine hood is set to reduce the speed of deflation after the expansion of the airbag, to be difficult to deflate, or hard to deflate with respect to the airbag body on the side of the handle bar.

A width of the airbag body on the side of the engine hood is set to be equal to or larger than a width of the vehicle when the airbag body is expanded, and a height of a front end portion of the airbag body when grounded in front of the vehicle body is set to be higher than a base portion of the airbag body.

The airbag body is colored other than white or in, for example, fluorescent color.

A relationship between widths is set to be $W1<W2<W3<W4$, where $W1$ represents a gripping distance of the handle bar, $W2$ represents a width of the airbag body on the side of the handle bar, $W3$ represents an entire width of the steering skid, and $W4$ represents a width of the airbag body on the side of the engine hood.

A steering shaft for supporting the handle bar is provided with a dividable portion which divides the steering shaft in an axial direction thereof and connect the steering shaft to the handle bar to be integrally rotatable.

The engine is a four-stroke-cycle engine.

The front end portion of the vehicle body frame is arranged between the storage housing for storing the airbag body on the side of the engine hood and the impact detection device when viewing the vehicle body in a side view.

In a fourth aspect of the present invention, there is also provided a snowmobile with an airbag system comprising:

a vehicle body extending in a longitudinal direction of a snowmobile;

a handle bar provided at an intermediate upper portion of the vehicle body for steering a steering skid;

an engine hood for covering a front portion of the vehicle body at a front side of the handle bar;

an engine mounted inside the engine hood; and an airbag system provided for the vehicle body, the airbag system comprising: an airbag body formed into a bag-shape; a storage housing for storing the airbag body; an impact detection device for detecting a collision of the vehicle body; an airbag expanding device for expanding the airbag body upon the collision of the vehicle body; and a controller for controlling the impact detection device and expansion of the airbag body, wherein the engine is inclined rearward so as to provide a space between the engine hood and the engine, and at least the airbag body and the storage housing are disposed in the space.

In this fourth aspect, the following preferred embodiments or examples may be provided.

The engine is a four-stroke-cycle engine. A front end portion of the vehicle body frame is arranged between the storage housing for storing the airbag body on the side of the engine hood and the impact detection device when viewing the vehicle body in a side view.

According to the above aspects of the present invention mentioned above, a plurality of the airbag bodies are arranged at adequate locations so as to be expanded and blown up at adequate timings into adequate dimensions as described above, safety of the rider on the snowmobile can be ensured upon a collision of the vehicle body.

In addition, since the airbag bodies, the storage housing, the airbag expanding device, the impact detection device, and the like are arranged to be detachable from the vehicle body, the functional durability, maintenance performance, serviceability, layout flexibility, and operability of the airbag system can be improved.

Furthermore, owing to the color, preferably, fluorescent color, of the airbag, the airbag can make itself stand out, and hence, it is available for the rescue of the rider upon an occurrence of accident.

It is further to be noted that the nature and further characteristic features of the present invention will be made more clear from the following descriptions made with reference to the accompanying drawings.

DESCRIPTION OF THE PREFERRED EMBODIMENTS

Figure 1:
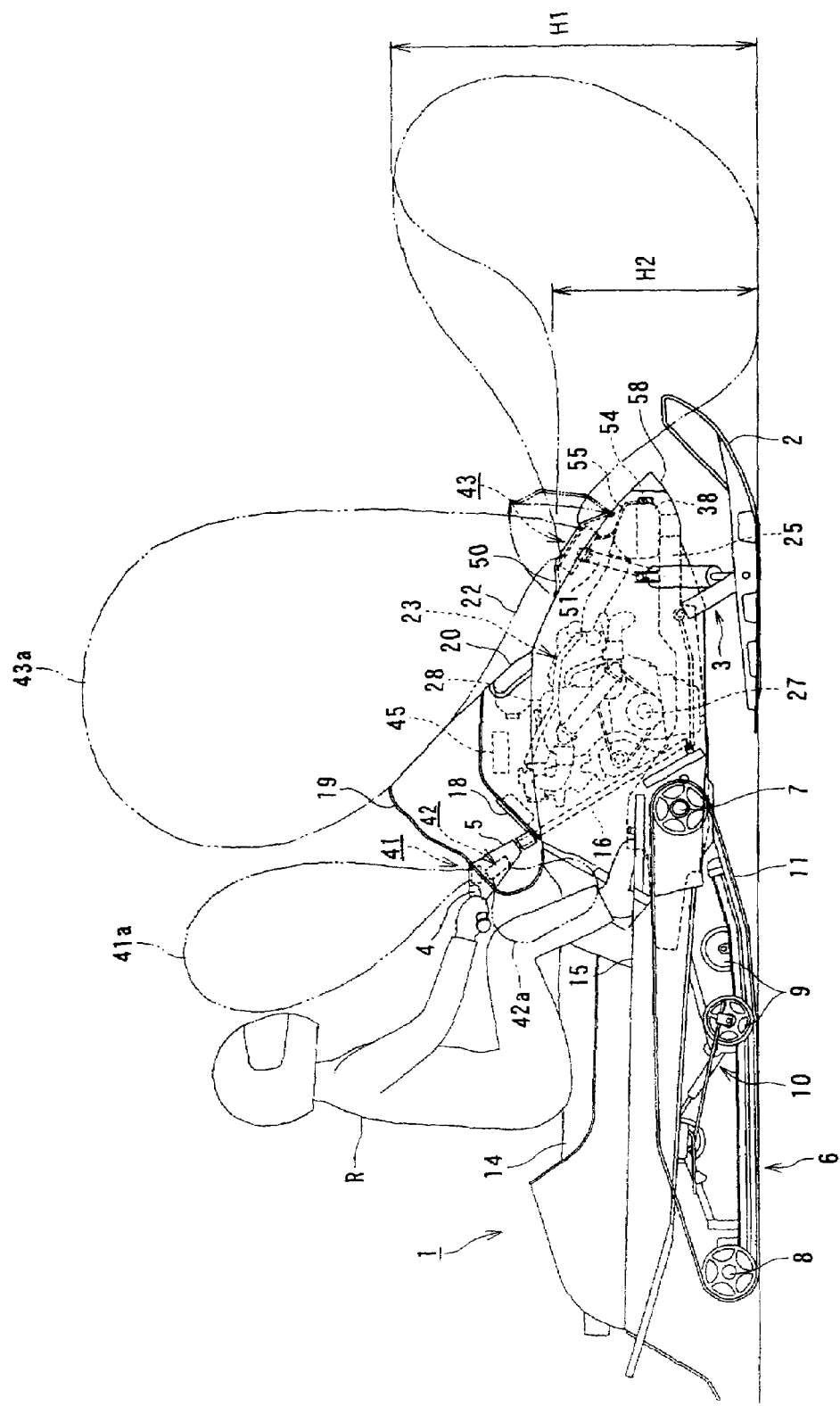
FIG. 1 is a schematic right side view of a snowmobile with an airbag system according to one embodiment of the present invention.

Referring now to the drawings, a preferred embodiment of the present invention will be described hereunder.

Further, it is first to be noted that the terms "upper", "lower", "right", "left" and the like terms are used herein in the illustrated state on the drawings or in the normal operable state of the snowmobile.

A snowmobile, generally shown in FIG. 1, is provided with a pair of left and right steering skids 2 at the lower front portion of a vehicle body extending in the fore-and-aft direction (i.e., longitudinal direction) of the vehicle body of the snowmobile, and the steering skids 2 are supported by front suspension mechanisms 3 so as to be buffered and steered to the left and right sides by a handle bar 4 provided above the center of the vehicle body, that is, at an intermediate upper portion of the vehicle body. The handle bar 4 is covered by a handle cover 5.

On the other hand, a crawler mechanism 6 is provided at the lower rear portion of the vehicle body. The crawler mechanism 6 includes, for example, a drive wheel 7 disposed on the front side, a driven wheel 8 disposed on the rear side, a plurality of intermediate wheels 9 disposed between these wheels 7 and 8, a rear suspension mechanism 10 for supporting the intermediate wheels 9 so as to be buffered, and an endless track 11 wound around the respective wheels 7 to 9.

A driver's seat 14 extending in the longitudinal direction of the vehicle body is provided above the crawler mechanism 6, and steps 15, being lower, by one step, than the level of the driver's seat 14, are provided on the left and right sides of the vehicle body, and the handle bar 4 is provided in front of the driver's seat 14 via a steering shaft 16. A meter panel 18, a windshield 19 and so on are provided in front of the handle bar 4, and a headlight 20 is provided at the front lower end of the windshield 19.

Figure 4:
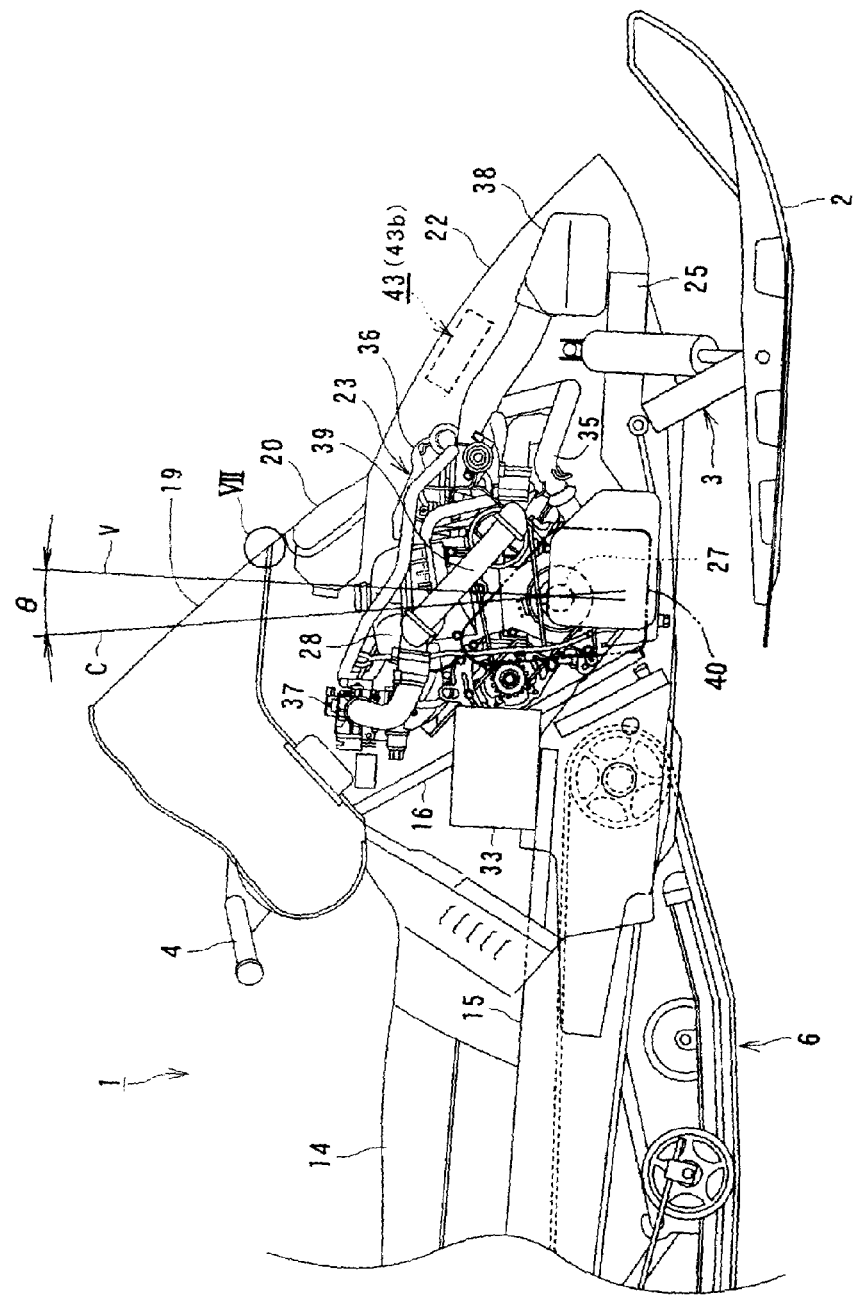
FIG. 4 is a perspective right side view of a front portion of the snowmobile with an airbag system in an enlarged scale.

As also shown in FIG. 4, the front portion of the vehicle body located forward the handle bar 4 is covered by an engine hood 22, which can be opened and closed, and an engine 23 is mounted therein. The engine hood 22 has a shape inclining downward toward the front from the lower front portion of the head light 20 as the highest point so as not to interrupt an optical axis of the head light 20. Reference numeral 25 designates the vehicle body frame disposed so as to extend in the longitudinal direction of the vehicle body.

The engine 23 includes, for example, a four-stroke-cycle in-line two-cylinder engine and is mounted in a manner that a crankshaft 27 extends laterally in the direction of the width of the vehicle body and a cylinder 28 is directed substantially upward. The engine 23 is disposed at a position offset slightly toward the left side in a plan view when viewed toward the traveling direction of the snowmobile.

Figure 2:
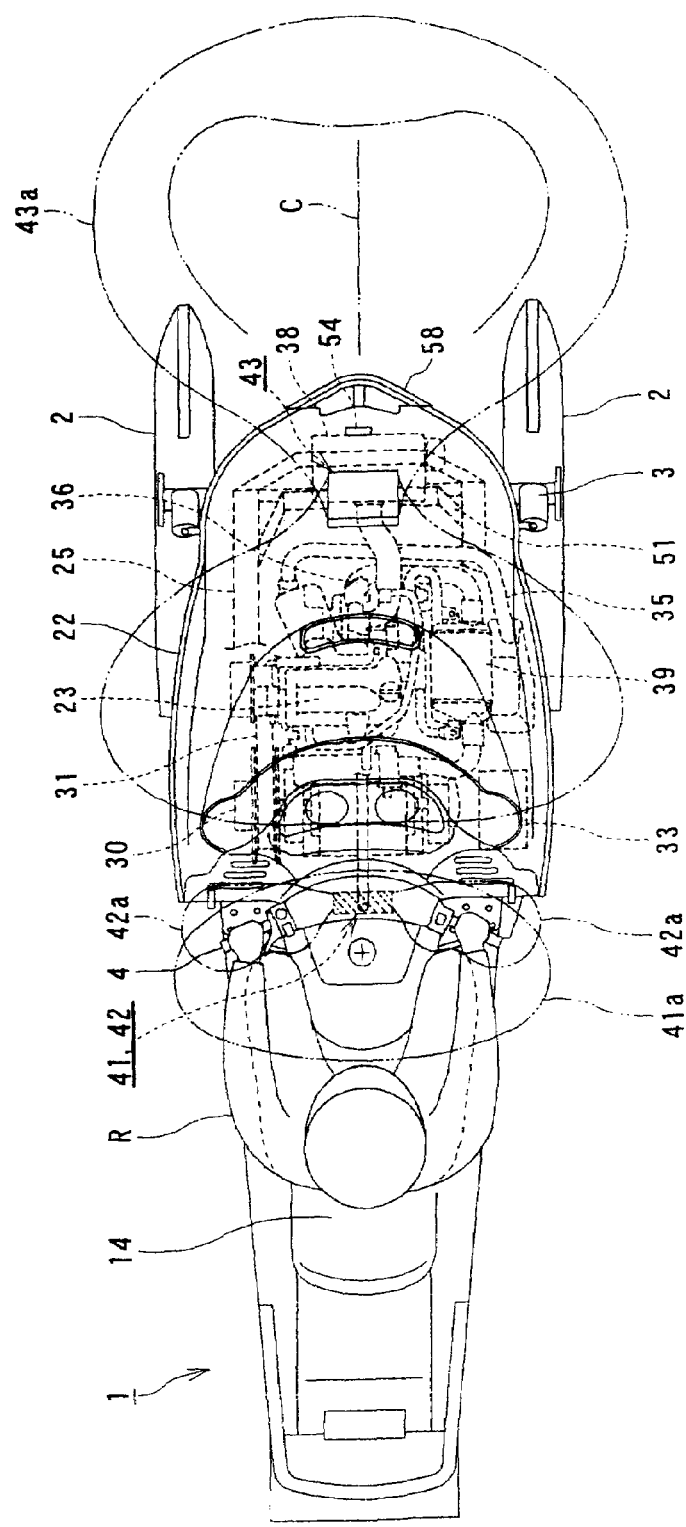
FIG. 2 is a plan view of the snowmobile with an airbag system.

As shown in FIG. 2, a CVT mechanism (continuously variable transmission) 30 is disposed behind the engine 23, and the rotation of the crankshaft 27 extending from the left side surface of the engine 23 is transmitted to the CVT mechanism 30 via a V-belt 31 and is then transmitted to the drive wheel 7 of the crawler mechanism 6 with a speed changed in a continuously variable manner. A battery 33 is mounted to the right side of the CVT mechanism 30.

An exhaust pipe 35 or a turbocharger 36 is disposed in front of the engine 23, and an intake device 37 is provided on the rear surface of the engine 23. An air-cleaner 38 for the intake air is provided in front of the engine 23, and an intercooler 39 is disposed on the right side of the engine 23.

In addition, the engine 23 is provided with an oil tank 40 (see FIG. 4) as a separate member and is of a type of a dry sump lubrication system for supplying an oil reserved in the oil tank to the engine 23 by driving a feed pump and a scavenge pump.

The snowmobile 1 is further provided with a plurality of airbag systems, including an upper airbag system 41 and a lower airbag system 42 for expanding and blowing up airbag bodies 41a, 42a respectively from the portions near the handle bar 4, and a front airbag system 43 for expanding an airbag body 43a from the upper surface of the engine hood 22. The respective airbag bodies 41a, 42a, 43a are formed into a bag-shape and the relative capacities (inner volumes) thereof in the expanded state are, for example, represented by 42a<41a<43a. A controller 45 for the respective airbag systems 41, 42, 43 is provided, for example, inside the meter panel 18.

Figure 5:
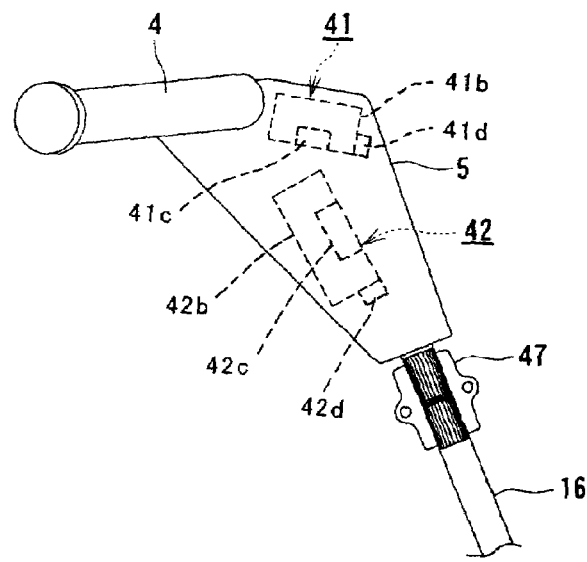
FIG. 5 is a right side view, in an enlarged scale, showing a structure of the portion near the handle bar.
Figure 6:
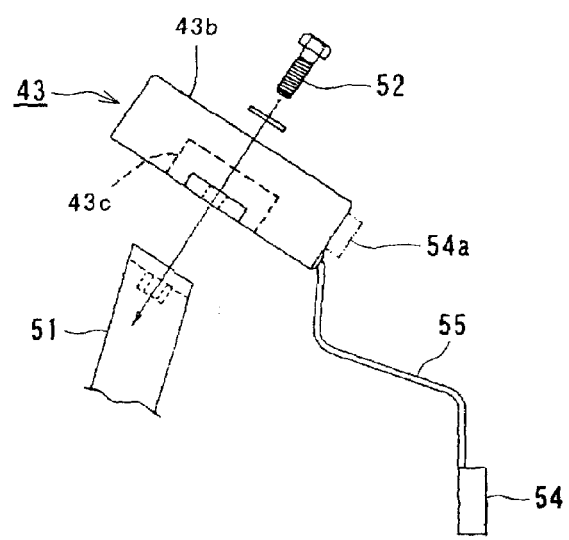
FIG. 6 is a right side view, in an enlarged scale, showing a mounting structure of a front airbag system.

The respective airbag bodies 41a, 42a, and 43a are stored in the storage or accommodation housings 41b, 42b and 43b in a folded state as shown in FIG. 5 and FIG. 6, respectively, in an enlarged scale, and inflators 41c, 42c and 43c as airbag blowing-up or inflating devices for expanding (inflating or blowing up) the respective airbag bodies 41a, 42a and 43a instantaneously by an explosive force of gunpowder or gas pressure are built in the respective storage housings 41b, 42b, 43b.

The upper airbag system 41 and the lower airbag system 42 are installed in such a manner that the airbag bodies 41a, 42a, the storage housing 41b, 42b, and the inflators 41c, 42c are disposed together with the handle bar 4 or at least one of components associated with the handle bar 4. In this embodiment, these components are installed inside the handle cover 5 for covering the handle bar 4. The upper airbag system 41 and the lower airbag system 42 may be combined integrally or into a unit.

The upper airbag system 41 and the lower airbag system 42 are capable of being attached to and detached from the vehicle body together with the handle bar 4 and the handle cover 5. As shown in FIG. 5, for example, a clump-type dividable portion 47 is provided at an intermediate section of the steering shaft 16, and the steering shaft 16 is separated in the axial direction and connected so as to be rotatable by the dividable portion 47. The steering shaft 16 is connected to the dividable portion 47, for example, by spline-coupling connection or serration-coupling connection. When releasing the fastening of the dividable portion 47, the handle bar 4, the handle cover 5, the upper airbag system 41 and the lower airbag system 42 can be removed together.

Figure 3:
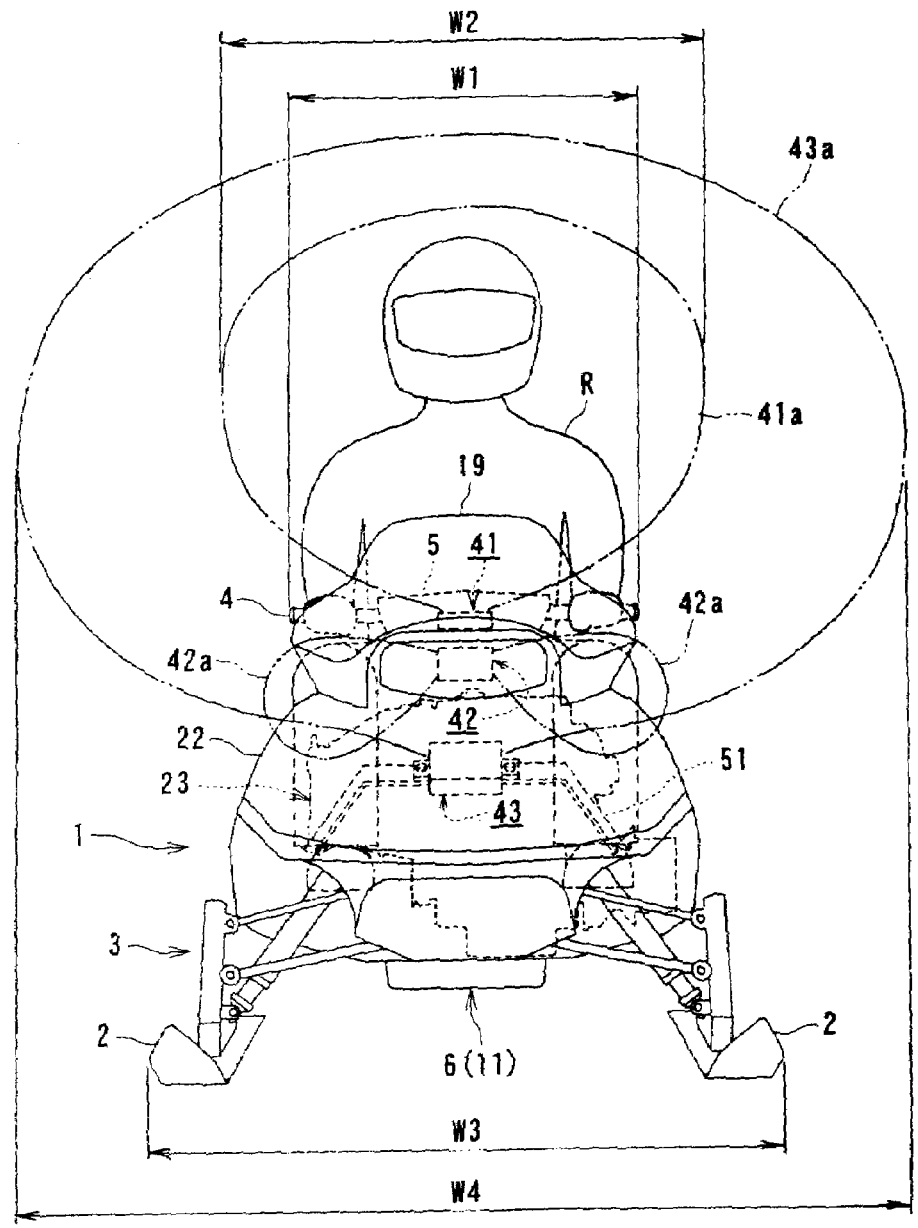
FIG. 3 is a front view of the snowmobile with an airbag system.

As shown in FIGS. 1 to 3, the airbag body 41a expanded from the upper airbag system 41 is blown up rearward of the vehicle body from the handle bar 4 and outward of the vehicle body from both ends of the handle bar 4 so as to take a height slightly higher than the top of the head of a rider R. On the other hand, the pair of left and right airbag bodies 42a expanded from the lower airbag system 42 are then blown up toward the front side of the rider R's knees. The airbag bodies 42a do not always have to be separated from each other on the left and right sides and may be formed as one piece.

On the other hand, the front airbag system 43 is disposed within an airbag grid 50 provided on the upper surface of the engine hood 22 so as to be capable of opening and closing. The airbag body 43a expanded from the front airbag system 43 is blown up in the direction of the windshield 19 provided behind the engine hood 22, and an inclined surface of the windshield 19 serves as a guide for the expanding and blowing-up of the airbag body 43a. As also shown in FIG. 6, the front airbag system 43 is secured to an airbag stay 51 as the airbag holding device which projects upright at a position near the front portion of the vehicle body frame 25 to be detachable from the vehicle body.

The front airbag system 43 including the airbag body 43a, the storage housing 43b, and the inflator 43c are detachable from the vehicle body alone or together with at least a portion of the engine hood 22, for example, the airbag grid 50. Accordingly, the front airbag system 43 can be stored indoors in the season when the snowmobile 1 is not used.

A G sensor 54 as an impact detection device for detecting collision of the vehicle body is connected to the front airbag system 43 via a harness 55. The G sensor 54 is installed in the engine hood 22 so as not to be exposed outside in order to prevent malfunction or improve durability and is fixed, for example, to the air cleaner 38 to be detachable from the vehicle body. Further, it may be possible to eliminate the harness 55 and integrate the G-sensor to the front surface of the front airbag system 43 as indicated by a reference numeral 54a in FIG. 6. Accordingly, the G sensor 54a can be unitized with the front airbag system 43 to thereby improve the function of attaching and detaching operation thereof, thus improving the maintaining performance.

The G-sensors 41d, 42d for activating the upper airbag system 41 and the lower airbag system 42 may be attached to the storage housings 41b, 42b as shown in FIG. 5. Alternatively, it may be possible to cause a single G sensor 54 (54a) to activate all of the upper airbag system 41a, the lower airbag system 42 and the front airbag system 43. The G-sensor 54 (54a, 41d, 42d) detects the impact of the collision and expands and blows up the airbag bodies 41a, 42a and 43a from the respective airbag system 41, 42 and 43.

The impact detection device may be composed of a device as long as it can detect the impact upon the collision, and the impact detection device is not limited to the G sensor, which is common to all the examples.

The position of the distal front end of the vehicle body frame 25 on the front side of the vehicle body is set to a position between the front airbag system 43 (i.e., storage housing 43b) and the G sensor 54 in the view seen from the side of the vehicle body (see FIG. 1). This is because that, though the vehicle body frame 25 is required to be strong, if the G sensor 54 is located behind the distal end of the strong vehicle body frame 25, there is a possibility that the front airbag system 43 may not function effectively. On the other hand, the front airbag system 43 must be prevented from being deformed by the impact of the collision and resulting in malfunction. According to the structure described above, the operability of the front airbag system 43 (42, 43) may be kept in good condition.

Although a bumper 58 is formed of a resilient material such as rubber or urethane at the front end of the vehicle body, the rigidity of the front end of the vehicle body is set to a value smaller than the rigidity of the remaining portion of the front half of the vehicle body for the reason of effectively protecting the rider, with the respective airbag systems 41 to 43, by providing the front end of the vehicle body with the impact absorbing property.

As shown in FIG. 4, a center line C passing through the center of the crankshaft 27 of the engine 23 is inclined rearward at a certain angle θ with respect to a vertical line V passing also through the center of the crankshaft 27 in the side view of the vehicle body of the snowmobile. Accordingly, a large space can be secured inside the engine hood 22 in front of the engine 23, and hence, the front airbag system 43 (at least the airbag body 43a and the storage housing 43b) may be disposed in this space. In this arrangement, the front airbag system 43 can be easily installed and can be kept apart from the exhaust pipe 35 or the turbocharger 36, which are heat sources, whereby the front airbag system 43 can be prevented from being excessively heated.

Upon collision or the like of the snowmobile 1, the G sensor 54 (or 54a, 41d, 42d) detects the impact of the collision and transmits the detection signal to the controller 45. The controller 45 transmits activation signals to the inflators 41c, 42c, 43c of the respective airbag systems 41, 42, 43 so as to expand and blow up the airbag bodies 41a, 42a, 43a. Therefore, the body of the rider R which is moving forward with respect to the vehicle body is received by the respective airbag bodies 41a, 42a, 43a, thus alleviating the impact to the rider R.

Furthermore, since the airbag body 41a of the upper airbag system 41 expands and blows up rearward of the handle bar 4 and outward of the both ends of the handle bar 4, and the airbag body 42a of the lower airbag system 42 expands and blows up toward the front side of the rider R's knees, the rider R can be prevented from colliding with the handle bar 4 or the vehicle body as much as possible.

The airbag body 43a of the front airbag system 43 expands from the upper surface of the engine hood 22 toward the windshield 19. Therefore, the rider R is effectively prevented from moving forward the vehicle body beyond the handle bar 4. Further, since the airbag body 43a is blown up by using the inclined surface of the windshield 19 as the guide slop, the airbag body 43 can be developed so as to provide a shape, capable of achieving the highest impact absorbing performance, expanding from the upper surface of the engine hood 22 in the obliquely rearward direction.

Figure 7:
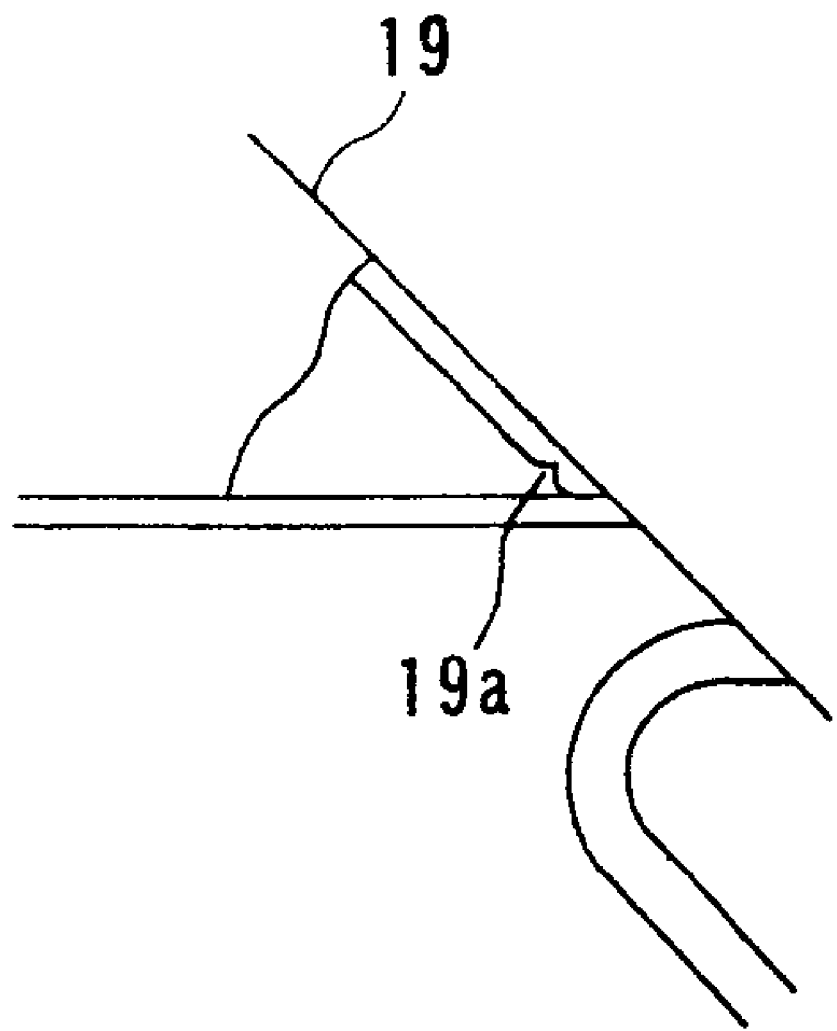
FIG. 7 is an enlarged view of a portion VII in FIG. 4.

Furthermore, as shown in FIG. 7, a rigidity reducing groove 19a is formed along the inner periphery of the lower edge of the windshield 19. Accordingly, when the body of the rider R is moved forward of the handle bar 4, the windshield 19 is disconnected from the rigidity reducing groove 19a, whereby the windshield 19 does not constitute any obstacle to the rider R.

Further, in the present embodiment, it can be selected whether only the airbag body 41a and the airbag body 42a are to be expanded, all the airbag bodies 41a, 42a and 43a are to be expanded, or the airbag body 43a is expanded at a timing delayed with respect to the timing of the expansion (blowing-up) of the airbag body 41a and of the airbag body 42a, depending on the degree of the impact of the collision.

The G sensor 54 detects the collision and generates a signal in accordance with a magnitude of the collision (degree of collision) to the controller 45. The controller 45 is provided with an impact discriminating element for discriminating the degree of the impact of the collision in response to the detection signal from the G sensor 54.

In this discrimination, the degree of the impact of the collision is compared with a first set value, and when being smaller than the first set value, only the airbag body 41a and the airbag body 42a are expanded and blown up. In the similar manner, when being larger than the first set value and lower than a second set value, the airbag body 43a is expanded and blown up with a timing delayed from the expanding timing of the airbag bodies 41a and 42a, and on the other hand, when being larger than the second set value, all the airbags 41a, 42a and 43a are simultaneously expanded and blown up.

According to such arrangement, since only the airbag bodies 41a and 42a are expanded and blown up upon a small scale of collision, and all the airbag bodies 41a, 42a and 43a are blown up upon a large scale of collision, the restoration to the traveling state after the expansion and blowing-up of the airbag can be easily done, and the cost of replacement of the airbag systems which have achieved its role (i.e., expanded and blown up) can be reduced.

Furthermore, the respective airbag systems 41, 42, 43, the controller 45 and the G sensor 54 may be constituted as two-system of a combination of the upper and lower airbag systems 41, 42 and the front airbag system 43, or as one system including all the systems together.

Preferably, the timing of expansion and blowing-up of the airbag body 43a is set to a timing later than the timings of the airbag body 41a and the airbag body 42a, and in addition, the surface area of the airbag body 43a in the expanded state is set to be larger than the surface areas of the airbag body 41a and the airbag body 42a in the expanded state.

Accordingly, two-step protection can be achieved such that, first, at the time of collision, the airbag body 41a and the airbag body 42a absorb the impact of the collision, and then, the airbag body 43a protects the rider R at the timing slightly later than the first timing. The increased surface area of the airbag body 43a in the expanded state contributes to increase the probability of receiving of the rider R's body, which does not necessarily move exactly toward the front of the vehicle after the collision.

In addition, it is also possible to set the speed of deflation of the airbag body 43a to be lower than the speed of deflation of the airbag bodies 41a, 42a or to constitute the airbag body 43a to be difficult to be deflated more than the airbag bodies 41a, 42a after the blown-up (i.e., inflation) of the respective airbag bodies 41a, 42a and 43a.

Accordingly, the airbag body 43a serves as an air mat at least temporarily to provide cushioning property, and hence, the probability of reception and protection of the rider's body can be further improved. Furthermore, by keeping the airbag body 43a in the air-mat state without being deflated in a certain case, the rider R protecting property can be further improved.

Incidentally, as shown in FIG. 3, in the present invention, relationship between distances or widths W1 to W4 are set so as to satisfy the equation W1<W2<W3<W4, where W1 represents a distance between the outer ends of the grip of the handle bar 4, W2 represents a width of the airbag body 41a in the expanded state, W3 represents an entire width of the steering skids 2 (=vehicle width), and W4 represents a width of the airbag body 43a in the expanded state.

Furthermore, as shown in FIG. 1, the dimension of the airbag body 43a is set so that the height H1 of the distal portion (front end portion) of the airbag body 43a at a time of being grounded on a portion in front of the vehicle body is set to be higher than the height H2 of the base (proximal) portion of the airbag body 43a. In addition, the airbag body 43a is formed so that the height thereof is increased to be maximum at the portion along the center line C of the vehicle body (see FIG. 2) in a plan view and is decreased from the center line C of the vehicle body toward both sides.

In other words, the airbag body 43a is formed so as to provide a shape increased in width, height and capacity toward the front of the vehicle in order to make maximal the probability of reception of the rider's body when moving toward the front of the vehicle body upon the collision. Then, the airbag 43a serves to cover the distal ends of the steering skids 2 so as to prevent the Rider R received by the airbag body 43a from colliding against the steering skids 2 to thereby achieve the safety of the rider R upon collision.

Since the height of the upper surface of the airbag body 43a when it is grounded on a portion in front of the vehicle body is decreased from the center line C toward the both sides of the vehicle body, the rider's body moved toward the front of the vehicle body upon collision is likely to roll on the upper surface of the airbag body 43a toward the left or right side after being received by the airbag body 43a, in the shape higher in front in the side view, whereby the contact between the rider R and the vehicle body can be positively prevented.

In this manner, by arranging a plurality of the airbag systems 41, 42 and 43 at adequate locations and causing the airbag bodies 41a, 42a and 43a to expand and blow up from the airbag systems 41, 42 and 43 at adequate timings and into adequate dimensions, the rider R on the snowmobile, which generally has a high degree of freedom of the rider R with respect to the vehicle body, can be safely protected upon the collision.

In a preferred embodiment, the airbag body 43a of the front airbag system 43 is formed in such a manner that the front side of this airbag body 43a is formed of a cloth stronger than a cloth forming the rear side thereof in the expanded state. According to this arrangement, when the airbag body 43a is grounded and subjected to friction with the snow surface, the front side thereof can hardly be torn, while the rear side on which the rider R comes in contact may be kept in soft texture.

By adapting the airbag systems 41, 42 and 43 and the G sensor 54 (54a), and the controller 45 detachably from the vehicle body, at least the airbag systems 41, 42 and 43 and the G sensor 54 (54a) can be stored indoors even if the snowmobile 1 is left outside for a long time during the season when the snowmobile is not used, whereby the functional maintenance, maintenance performance, serviceability, layout flexibility, and operability of the respective airbag systems and the G sensor can be improved.

By coloring the respective airbag bodies 41a, 42a and 43a, preferably into fluorescent color, the respective airbag bodies 41a, 42a and 43a can make themselves stand out by its own color (fluorescent color) in the snow after expanding and blowing-up, and hence, the rider on the snowmobile in an occurrence of an accident can be easily found out and rescued.

The four-stroke-cycle engine is mounted in this snowmobile, which is not provide with such an exhaust chamber, having a large capacity and easily increasing in temperature, as provided with a conventional two-stroke-cycle engine, the temperature in the engine hood 22 can be reduced, whereby the front airbag system 43 stored in the engine hood 22 can be maintained in a good condition. Further, it is to be noted that, as a matter of course, all the aforementioned structures can be applied not only to the four-stroke-cycle engine, but also to the snowmobile having the two-stroke-cycle engine mounted thereon.

It is to be further noted that the present invention is not limited to the described embodiment, and many other changes and modifications may be made without departing from the scopes of the appended claims.

What is claimed is:

1. A snowmobile with an airbag system comprising:
a vehicle body extending in a longitudinal direction of a snowmobile;
a handle bar provided at an intermediate upper portion of the vehicle body for steering a steering skid;
an engine hood for covering the front portion of the vehicle body at a front side of the handle bar;
a windshield provided at a rear portion of the engine hood;
an engine mounted inside the engine hood;
a vehicle body frame provided so as to extend in the longitudinal direction of the vehicle body;
an airbag system provided for the vehicle body, the airbag system comprising: an airbag body formed into a bag-shape; a storage housing for storing the airbag body; an impact detection device for detecting a collision of the vehicle body; an airbag expanding device for expanding the airbag body upon the collision of the vehicle body; and a controller for controlling the impact detection device and expansion of the airbag body,
wherein the airbag body includes a first airbag body expanding from a portion near the handle bar and extending rearward of the vehicle body over the handle bar and outward of the vehicle body over both ends of the handle bar, and a second airbag body expanding from an upper surface of the engine hood toward the windshield and utilizing an oblique surface of the windshield as an expanding guide slope.

2. The snowmobile with an airbag system according to claim 1, wherein it is selected, depending on a degree of an impact of the collision, whether only the airbag body on the side of the handle bar is to be expanded, both the airbag body on the side of the handle bar and the airbag body on the side of the engine hood are to be expanded, and the airbag body on the side of the engine hood is delayed in an expansion timing with respect to a timing of the expansion of the airbag body on the side of the handle bar.

3. The snowmobile with an airbag system according to claim 1, wherein the timing of the expansion of the airbag body on the side of the engine hood is delayed with respect to the timing of expansion of the airbag body on the side of the handle bar, and the surface area of expansion of the airbag body on the side of the engine hood is larger than the surface area of expansion of the airbag body on the side of the handle bar.

4. The snowmobile with an airbag system according to claim 1, wherein at least the airbag body, the storage housing and the airbag expanding device of the airbag system have a structure detachable from the vehicle body integrally with the handle bar and at least one of components associated with the handle bar.

5. The snowmobile with an airbag system according to claim 1, wherein the impact detection device is provided to be detachable from the vehicle body.

6. The snowmobile with an airbag system according to claim 1, wherein the impact detection device is integrated with the storage housing.

7. The snowmobile with an airbag system according to claim 1, wherein a width of the airbag body on the side of the engine hood is set to be equal to or larger than a width of the vehicle when the airbag body is expanded, and a height of a front end portion of the airbag body when grounded in front of the vehicle body is set to be higher than a base portion of the airbag body.

8. The snowmobile with an airbag system according to claim 1, wherein the airbag body is colored other than white color or in fluorescent color.

9. The snowmobile with an airbag system according to 1, wherein the engine is a four-stroke-cycle engine.

10. The snowmobile with an airbag system according to 1, wherein a front end portion of the vehicle body frame is arranged between the storage housing for storing the airbag body on the side of the engine hood and the impact detection device when viewing the vehicle body in a side view.

11. The snowmobile with an airbag system according to claim 1, wherein a relationship between widths is set to be $W1<W2<W3<W4$, where W1 represents a gripping distance of the handle bar, W2 represents a width of the airbag body on the side of the handle bar, W3 represents an entire width of the steering skid, and W4 represents a width of the airbag body on the side of the engine hood.

* * * * *